3,133,959
HALOALKYL-1,3-PROPANEDIOL DICARBAMATES

Joseph Seifter, Berwyn, and Cathryn H. Gudmundsen, Wynnewood, Pa., assignors to American Home Products Corporation, New York, N.Y., a corporation of Delaware
No Drawing. Filed Mar. 29, 1962, Ser. No. 183,348
5 Claims. (Cl. 260—482)

This invention relates to new organic dicarbamates. More particularly it relates to new haloalkyl-1,3-propanediol dicarbamates.

According to the present invention novel and particularly useful compounds are formed by the introduction of a halogen atom in one of the alkyl side-chains of a 2,2-dialkyl substituted-1,3-propanediol dicarbamate.

Dicarbamates of 2,2-dialkyl substituted-1,3-propanediols are known to possess muscle relaxant and anti-convulsant activities, and are widely used as tranquilizers. As an important feature of this invention, however, it has been discovered that introduction of a chloro group in the propyl side-chain of 2-methyl-2-n-propyl-1,3-propanediol dicarbamate (meprobamate) results in a compound which while retaining the muscle relaxant and anti-convulsant activities has an unexpectedly lower toxicity. More important, the new compound possesses valuable analgesic activity not found in nitrogen-atom-unsubstituted or unhalogenated dicarbamates. Thus in one molecule unexpectedly are combined two very desirable effects with a minimum of side-effects.

The acute intro-abdominal toxicity in mice of the compounds of this invention is lower than that of meprobamate, the LD-50 of 2(3-chloropropyl)-2-methyl-1,3-propandiol dicarbamate being somewhat in excess of 1000 mg./kg. and no deaths occurring up to 800 mg./kg. Analgesic studies indicate that this compound inhibits the response to thermally induced pain without visibly affecting behavior and doses of 32 to 100 mg./kg. intro-abdominally are more effective than similarly administered doses of meprobamate. Against metrazol, however, a measure of the muscle relaxant effect, this compound and meprobamate are equipotent for converting the LD-100 to LD-0.

Schematically the preparation of the compounds of this invention may be represented as follows:

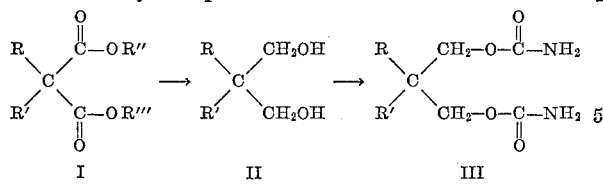

where R is a halogen-substituted lower alkyl group, and R', R'', and R''' are lower alkyl groups. The novel alkyl haloalkyl propanediol dicarbamates (III) of this invention may be prepared by reacting an alkyl haloalkyl propanediol (II) with phosgene to form the corresponding chlorocarbonate and then treating said chlorocarbonate with aqueous ammonia. They may also be prepared from the alkyl haloalkyl propanediol by ester interchange with ethyl urethane.

The alkyl haloalkyl propanediols (II) above referred to may be prepared by selective reduction of the dialkylester of the corresponding alkyl haloalkyl malonic acid. Care must be taken not to remove the halogen group when the ester groups are reduced. Reagents suitable for this purpose are aluminum hydride complexes, such as lithium aluminum hydride and aluminum chloride-aluminum hydride.

The compositions are preferably administered as oral medicaments in the form of tablets, or capsules, although solutions, suspensions, syrups also fall within the contemplated scope of the invention. These are prepared utilizing known excipients or carriers.

The following examples will illustrate how the novel compounds of this invention may be prepared.

EXAMPLE I

*Preparation of 2-(3-Chloropropyl)-2-Methyl-1,3-Propandiol Dicarbamate*

The sodium salt of diethyl methylmalonate is prepared by gradually adding 4.6 g. (0.2 mole) of sodium to a solution of 34.8 g. (0.2 mole) of ester in 150 ml. of benzene. After the addition is complete, the solution is stirred with warming for one hour. The reaction is allowed to cool, 40.8 g. (0.2 mole) of 1-chloro-3-iodopropane added, and heating resumed. The mixture is refluxed for nine hours, cooled, shaken with water to remove the sodium iodide, and the benzene layer separated and dried over anhydrous sodium sulfate.

Removal of the benzene and fractionation of the residue afford approximately 20.5 g. of diethyl 2-(3-chloropropyl)-2-methyl-malonate, B.P. 79–81°/0.11–0.16 mm., a 41% yield.

A 250 ml., 3-necked flask is fitted with stirrer, condenser protected with a calcium chloride tube, and addition funnel. Diethyl 2-(3-chloropropyl)-2-methylmalonate 20 g. (0.08 mole) is added gradually to a cooled suspension of 3.4 g. (0.09 mole) of lithium aluminum hydride in 100 ml. of anhydrous ether. The mixture is stirred at room temperature for one hour after the addition of the ester. The complex is hydrolyzed with 10% aqueous sulfuric acid-ice mixture, the ether separated, and the water layer is extracted repeatedly with ether. The combined ether solution is washed wtih water and dried over anhydrous $MgSO_4$.

After separation of the drying agent and removal of the solvent, 2 - (3-chloropropyl)-2-methyl-1,3-propanediol is obtained from the ether solution as a white solid. The yield of once-recrystallized product from ether-petroleum ether is about 9.5 g. (72%), M.P. 59–62° C. This material gives a positive Beilstein test for halogen.

Thirteen grams (0.13 mole) of phosgene is condensed and charged into a 40 ml. of tetrahydrofuran at −10° C. contained in a 150 ml., 3-necked flask fitted with stirrer, Dry Ice condenser protected with a calcium chloride tube, and addition funnel. A cooled solution of 9 g. of 2-(3-chloropropyl)-2-methyl-1,3-propanediol (0.06 mole) in 30 ml. of tetrahydrofuran is added over a 30 minute period. The solution is stirred at −5 to −10° C. for 2 hours and then allowed to warm to 8° C. Conversion of the chlorocarbonate to the carbamate is accomplished by pouring the reaction mixture into 30 ml. of cold concentrated aqueous ammonia to which is added some ice. The solution is stirred for ten minutes, 25 ml. of water added, and then warmed on the steam bath. An additional 25 ml. of water is added after most of the tetrahydrofuran has been removed. The product crystallizes form the cool aqueous solution. After one recrystallization from water, the yield of vacuum dried 2-(3-chloropropyl)-2-methyl-1,3-propanediol dicarbamate is about 9 g. (67%), M.P. 127–128° C.

| Analysis | C, percent | H, percent | N, percent | Cl, percent |
|---|---|---|---|---|
| Calculated for $C_9H_{17}O_4N_2Cl$ | 42.78 | 6.78 | 11.08 | 14.03 |
| Found | 42.83 | 6.85 | 10.90 | 14.07 |

EXAMPLE II

*Preparation of 2-(2-Chloroethyl)-2-Methyl-1,3-Propanediol Dicarbamate*

To a suspension of the sodium enolate of diethyl methylmalonate in benzene, prepared by gradually adding 6.9 grams (0.3 mole) of sodium to 87 grams (0.5 mole) of ester, is added 85.8 grams (0.6 mole) of 1-bromo-2-chloro-ethane. The reaction mixture is stirred at 70° C. for two days, cooled to room temperature, and the pH adjusted to 5 with a few drops of glacial acetic acid. Water is added to the contents of the flask, the resulting mixture transferred to a separatory funnel, the benzene layer separated, and organic phase again washed with water. The benzene solution is dried over anhydrous $Na_2SO_4$. The ether extract of the aqueous washings is also dried over anhydrous $Na_2SO_4$. Fractionation of the combined residues from the benzene and ether solutions gives 36 grams of product collected at 74°–78°/0.3 mm.

The reduction of the chloroalkyl malonic ester to the corresponding diol, employing $LiAlH_4$ as the reducing agent, is performed in the conventional manner; namely, the ester (22 grams) is added from a dropping funnel to a cold, stirred suspension of $LiAlH_4$ (3.7 grams) in 150 ml. of anhydrous ether. After addition is complete, stirring is continued for two hours during which time the mixture is allowed to come to room temperature. Unreacted $LiAlH_4$ is decomposed by the cautious addition of water. The mixture is then carefully stirred into a mixture of ice and 10% sulfuric acid. The aqueous acid phase is separated and repeatedly extracted with ether. The ether extracts are combined with the original ether solution and the whole dried over anhydrous $MgSO_4$. Removal of the ether and recrystallization of the residue from ether-petroleum ether (1:10) affords about 2.6 grams of product melting at 53° C. An additional one gram of product may be isolated from the mother liquor, M.P. 51–52° C. Total yield of product was 26%.

A 300 ml., 2-necked flask, fitted with a magnetic stirrer, Dry Ice-acetone cooled condenser protected with a $CaCl_2$ drying tube, and pressure equalizing dropping funnel, is immersed in a cooling bath maintained at −15° C. and is charged with 30 ml. of tetrahydrofuran and 4 ml. of phosgene. The diol solution, 4.25 grams diol in 20 ml. of tetrahydrofuran, is introduced dropwise. The reaction mixture is stirred for two hours during which time the temperature is gradually increased to 0° C. Upon reaching 8° C. the mixture is poured into ice-cold 28% ammonia (25 ml.) to which some ice is added. The mixture is stirred for ten minutes, then warmed on a steam bath in order to remove the tetrahydrofuran. The crude product solidifies as the aqueous solution cools. Recrystallization from 15% aqueous ethanol affords about 2.5 grams (36%) of product, melting at 105–106.5° C.

| Analysis | C, percent | H, percent | N, percent | Cl, percent |
|---|---|---|---|---|
| Calculated for $C_8H_{15}ClN_2O_4$ | 40.27 | 6.29 | 11.75 | 14.85 |
| Found | 40.35 | 6.36 | 11.66 | 14.95 |

EXAMPLE III

*Preparation of 2-(2-Chloropropyl)-2-Methyl-1,3-Propanediol Dicarbamate*

Following the procedure of Example 1, the diethyl ester of 2-(2-chloropropyl)-2-methylmalonic ester is prepared from sodium, diethyl methylmalonic ester and 2-chloro-1-iodopropane, reduced to the corresponding diol by selective reduction, and the diol converted to 2-(2-chloropropyl)-2-methyl-1,3-propanediol dicarbamate by treatment with phosgene and ammonia.

We claim:

1. 2-chloroloweralkyl-2-lower-alkyl-1,3-propanediol dicarbamates.

2. As a composition of matter one of the group consisting of 2-(3-chloropropyl)-2-methyl-1,3-propanediol dicarbamate, 2-(2-chloroethyl) - 2 - methyl-1,3-propanediol dicarbamate and 2-(2-chloropropyl) - 2 - methyl-1,3-propanediol dicarbamate.

3. 2-(3-chloropropyl)-2-methyl-1,3-propanediol dicarbamate.

4. 2 - (2-chloroethyl)-2-methyl-1,3-propanediol dicarbamate.

5. 2-(2-chloropropyl) - 2 - methyl-1,3-propanediol dicarbamate.

No references cited.